B. N. MARTY.
AUTOMATIC BASE BALL PITCHING MACHINE.
APPLICATION FILED APR. 29, 1916.
1,204,468.
Patented Nov. 14, 1916.
2 SHEETS—SHEET 2.
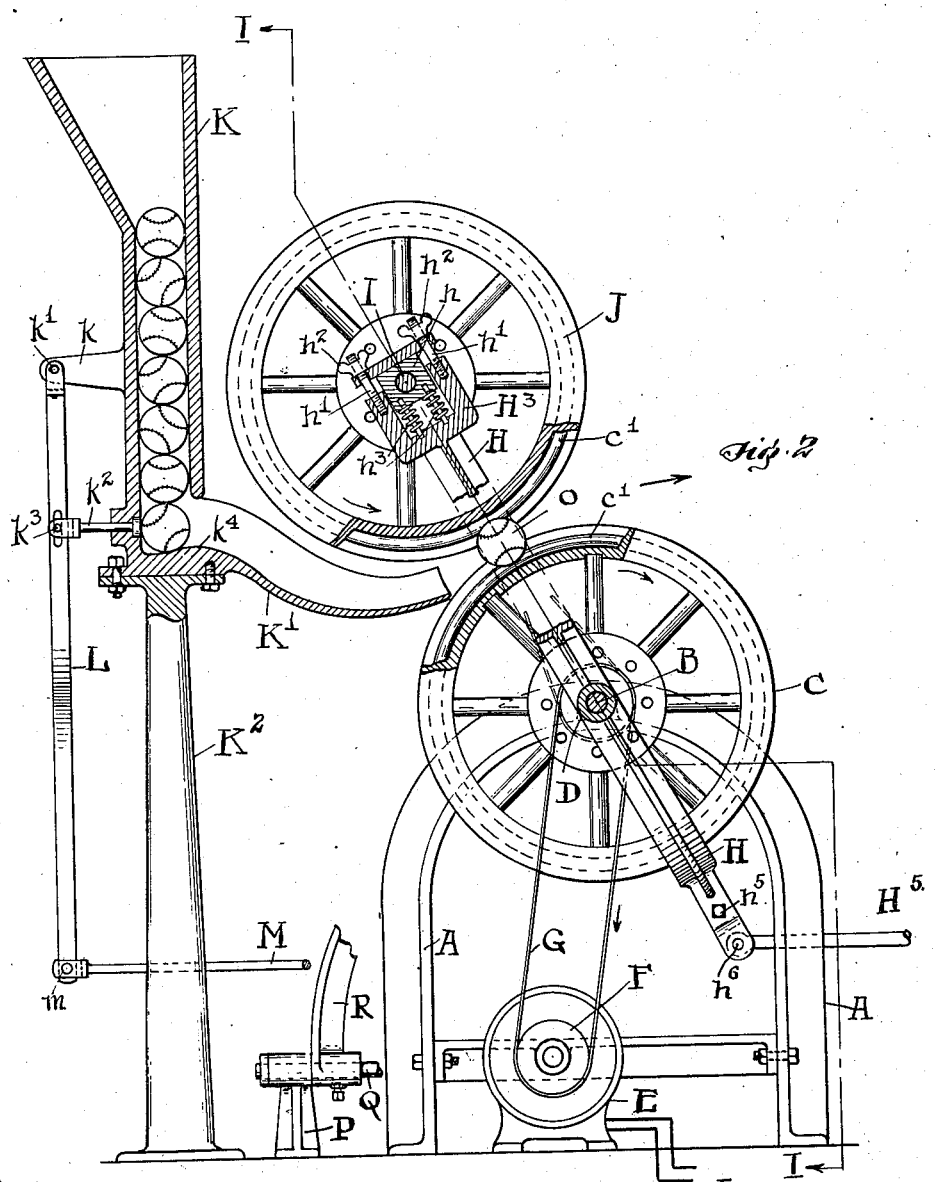

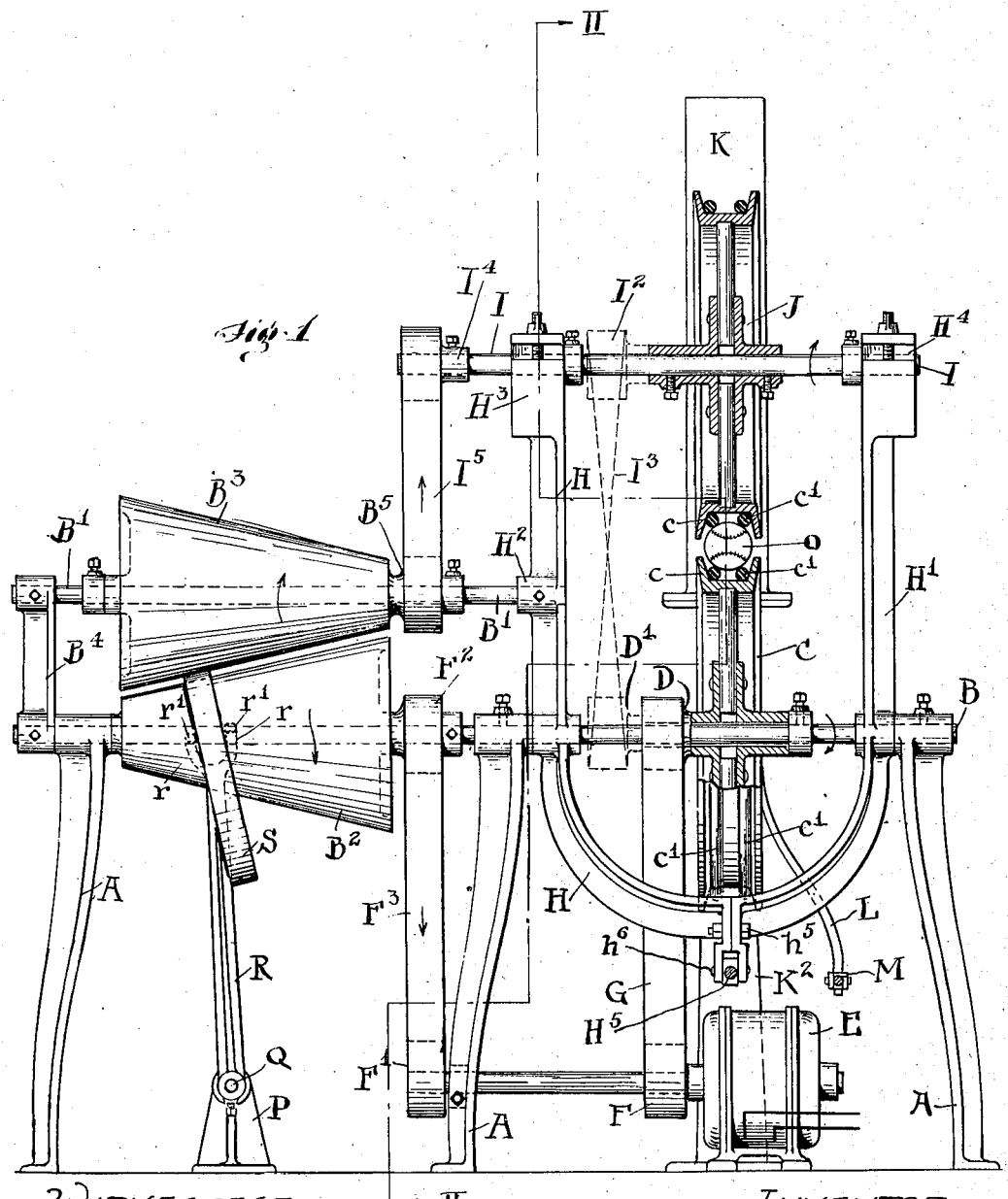

UNITED STATES PATENT OFFICE.

BARTLEY N. MARTY, OF LAKEWOOD, OHIO.

AUTOMATIC BASE-BALL-PITCHING MACHINE.

1,204,468.　　　　　Specification of Letters Patent.　　Patented Nov. 14, 1916.

Application filed April 29, 1916. Serial No. 94,489.

*To all whom it may concern:*

Be it known that I, BARTLEY N. MARTY, a citizen of the United States, residing in Lakewood, Cuyahoga county, Ohio, have invented certain new and useful Improvements in Automatic Base-Ball-Pitching Machines, of which the following, in connection with the accompanying drawings, is a specification, such as will enable others skilled in the art to which it appertains to make and use the same.

The object of the invention is to construct in the simplest form a machine that will hurl a baseball with sufficient speed and at the same time with a twisting motion approximating that of a ball thrown by hand.

The machine embodying my invention consists of a pair of wheels or pulleys mounted within a suitable frame, means for revolving said wheels or pulleys in opposite directions and means for feeding the balls between the pulleys as hereinafter described.

It also consists in so mounting the frame supporting said wheels that it may be adjusted to throw the ball at a higher or lower angle and means for controlling said angle and delivering the ball to the batter at the desired height.

With the machine herein described I am enabled to control and vary the twist imparted to the ball and thereby to throw the ball with varying degrees of top spin or under spin and so to deliver what is known as a "drop" ball or a "raise" or "up-shoot" as may be desired.

In the accompanying drawings Figure 1 is a front elevation of the machine partly in section. Fig. 2 is a side elevation partly in section from line II, II, Fig. 1.

A, A, represents the frame supports for the machine. B, is the central shaft mounted in the frame supports. C a grooved wheel mounted on the shaft B, and D a pulley also mounted on shaft B and preferably integral with the wheel C.

E is an electric motor for driving the machine. F a pulley on the motor shaft and G a belt for driving the pulley D.

H, H$^1$, are frame elements pivoted on the shaft B, joined at their lower end at $h^5$, and extending upward beyond the shaft B and ending in bearing supports H$^3$, H$^4$, which in turn support the shaft I.

J is a pulley similar to C and mounted on the shaft I above and directly in line with C. At each side of the center of the groove in the pulley C are rings, $c$, $c^1$, made of rubber or similar yielding material and attached to the wheel in any suitable manner. The wheel J is provided with similar rings similarly attached.

B$^2$ is a conical drum mounted on the shaft B, attached to the pulley F$^2$ and with the pulley is rigidly attached to the shaft. On the outer end of the shaft B is an arm B$^4$ extending to and supporting the outer end of a shaft B$^1$. The inner end of the shaft B$^1$ is supported in the frame element H at H$^2$.

B$^3$ is a conical drum attached to the pulley B$^5$ and both are loosely mounted on the shaft B$^1$.

P is a support or standard mounted on the floor and supporting the shaft Q, which in turn supports the arm R, which terminates at its upper end in the prongs $r$, $r$, supporting the pins $r^1$, $r^1$, extending therefrom at substantially a right angle.

S is a circular band around the outside of the drum B$^2$, with its inner surface adapted to impinge against the surface of the conical drum B$^2$, and its outer surface to impinge against the surface of the conical drum B$^3$. The inner surfaces of the pins $r^1$, $r^1$, engage the sides of the band S and are adapted to force the band S along the direction of the axis of the drums and hold it in the desired position.

F$^1$ is a pulley mounted on the motor shaft and adapted to drive the pulley F$^2$ and drum B$^2$ by means of the belt F$^3$.

I$^4$ is a pulley mounted on the outer end of the shaft I and carries a belt I$^5$ leading from the pulley B$^5$.

D$^1$ is a pulley mounted on the shaft B and attached to the pulley D.

I$^2$ is a pulley mounted on the shaft I and carries a belt I$^3$ runing from the pulley D$^1$.

In the bearing support H$^3$ is a bearing $h$, broadened at its upper end and perforated to receive the bolts $h^1$, $h^1$, (Fig. 2) mounted in the bearing supports and provided at the outer end with the nuts $h^2$, $h^2$. Between the lower side of the bearing $h$, and the bottom of the bearing support are coil springs $h^3$, $h^3$, mounted on suitable guides and adapted to force the bearing $h$ upward. By means of these coil springs and the nuts $h^2$, $h^2$, the bearing may be adjusted as desired. The bearing support $h^4$ is provided with a similar bearing adjustable in the same manner. For the purpose of controlling the elevation at which the ball is thrown to the batter, the lower ends of the frame elements H, H¹, are attached to the rod H⁵, at h⁶, the operator, through the rod H⁵, controlling the position of the frame elements H, H¹, and the wheels mounted between said elements.

The balls are carried from the hopper K through the chute K¹ at its lower end. The hopper is mounted on stand K². At the rear end of the hopper is an extending arm k which supports the lever L pivotally attached thereto at k¹. The stem k² is mounted in the lower end of the hopper K and attached to the lever L at k³. At the lower end of the lever L it is attached to the rod M at m, the rod M extending forward to the point where the operator is stationed, preferably behind the batter. At the bottom of the inside of the hopper K, is a small rise marked K⁴ to prevent the balls rolling into the chute, without movement of the stem k².

It is immaterial whether one or both of the wheels C and J is grooved or provided with rings of yielding material, all that is required being that one or the other should be sufficiently grooved to cause the ball to be thrown with reasonable accuracy in the direction in which the periphery of the inner side of the wheels travels. I deem it preferable to provide each wheel with a V shaped groove or with the rings of yielding material inasmuch as at all times when the speed of the wheels is not identical the amount of spin imparted to the ball will be greater if the contact between the wheel and the ball is nearer the axis of the ball than if the contact between them be nearer to or at the surface of the ball. The periphery of the wheels may be made flat and a stationary guide provided on each side of the wheels at the point where they come in contact with the ball and the ball be thereby caused to travel in substantially the desired direction, but I prefer the grooved wheels as herein described. It is also apparent that any of the several known forms of device may be adapted for differentiating the speed at which the wheels revolve.

The motor is adapted to revolve the lower wheel C so that its upper surface moves to the right, (Fig. 2) and the motion of the wheel J, imparted through the differential drums (or directly through pulleys D¹ and I²) will be in a direction opposite to that of the pulley C. If it be desired that the machine shall at all times throw the ball with the same twist or spin, or without any spin, the differential mechanism may be omitted and the upper wheel J operated directly with a cross-belt from the pulley D¹ on the shaft B to the pulley I² on the shaft I, as shown in dotted lines, Fig. 1.

The operation of the machine is as follows: A suitable number of balls are placed in a hopper K, the one at the bottom being retained in position by the incline k⁴ at the bottom of the hopper. The operator sets the motor in motion, revolving the wheels C and J as above indicated, the speed of the motor being controlled in the ordinary manner and as desired to pitch either a fast ball or a slow ball. The operator by pulling the rod M and actuating the lever L and stem k² forces the lowest ball in the hopper into the chute K¹ from which it rolls into contact with the surface of the wheel C and is thus drawn between the surfaces of the wheels C and J. If these wheels are revolving at the same speed, the ball will be thrown forward without perceptible spin. If it is desired to give the ball top spin the operator, by turning the shaft Q and the upper end of the lever R to the right, (Fig. 1) will force the ring S toward the larger end of the conical drum B², thereby accelerating the speed of the drum B³ and the wheel J. The speed of the periphery of the wheel J, or more exactly, the elastic rings c, c¹, being greater than the speed of the corresponding part of the wheel C, will move the upper side of the ball forward more rapidly than the lower side of the ball, thereby imparting top spin. If, on the other hand, it is desired to impart to the ball an under spin, the operator forces the top of the lever R to the left, imparting a slower motion to the drum B³ and the wheel J, with the result that the surface of the wheel C, which comes in contact with the lower side of the ball, will be traveling at a greater rate of speed than the corresponding surface of the wheel J, moving the lower side of the ball forward more rapidly and so causing the under spin. In this manner the operator controls the speed of the wheel and the speed of the motor and controls the spin of the ball by controlling the position of the ring S through the position of the lever R. When the machine is constructed without the differential speed mechanism, the operator controls the speed of delivery by controlling the speed of the motor. The height at which the ball is delivered to the batter is controlled by the operator through rod H⁵. To throw a high ball, the rod is pulled to the right, (Fig. 2), drawing the upper wheel in the direction of the hopper, elevating the line of flight of the ball. For a low ball, rod H⁵ is forced in the opposite direction, lowering the line of flight of the ball.

Having described my invention I claim:

1. In a baseball pitching machine, the combination of a pair of wheels, a suitable frame in which said wheels are rotatably mounted in alinement with each other, said wheels being separated such distance that a baseball placed between them will come in contact with the adjacent peripheries of the wheels, and means for revolving said wheels simultaneously in opposite directions, whereby a ball placed between said wheels will be thrown in the direction in which the adjacent peripheries of the wheels are rotated.

2. In a baseball pitching machine, the combination of a pair of wheels, a suitable frame in which said wheels are rotatably mounted in alinement with each other, said wheels being separated such distance that a baseball placed between them will come in contact with the adjacent peripheries of the wheels, and means for revolving said wheels simultaneously in opposite directions, but at different speeds, whereby a ball placed between said wheels will be thrown in the direction in which the adjacent peripheries of the wheels are rotated and will be given top spin or under spin according to the relative speeds of the upper and the lower wheels.

3. In a baseball pitching machine, the combination of a pair of grooved wheels, a suitable frame in which said wheels are rotatably mounted in alinement with each other, said wheels being separated such distance that a baseball placed between them will come in contact with the surface of the groove in each, and means for revolving said wheels simultaneously in opposite directions, whereby a ball placed between said wheels will be thrown in the direction in which the adjacent peripheries of the wheel are rotated.

4. In a baseball pitching machine the combination of a pair of grooved wheels, a suitable frame in which said wheels are rotatably mounted in alinement with each other, said wheels being separated such distance that a baseball placed between them will come in contact with the surface of the groove in each, and means for revolving said wheels simultaneously in opposite directions, but at different speeds, whereby a ball placed between said wheels will be thrown in the direction in which the adjacent peripheries of the wheels are rotated and will be given top spin or under spin according to the relative speeds of the upper and lower wheel.

5. In a baseball pitching machine the combination of a pair of wheels, an adjustable frame in which said wheels are rotatably mounted in alinement with each other, said wheels being separated such distance that a baseball placed between them will come in contact with the adjacent peripheries of the wheels, means for revolving said wheels simultaneously in opposite directions and means for adjusting the position of said frame and the upper wheel, to elevate and lower the trajectory of the ball.

6. In a baseball pitching machine the combination of a pair of grooved wheels, an adjustable frame in which said wheels are mounted in alinement with each other, said wheels being separated such distance that a baseball placed between them will come in contact with the surface of the groove in each if the wheels, means for revolving said wheels simultaneously in opposite directions and means for adjusting the position of said frame and the upper wheel to elevate and lower the trajectory of the ball.

7. In a baseball pitching machine the combination of a pair of wheels, an adjustable frame in which said wheels are rotatably mounted in alinement with each other, said wheels being separated such distance that a baseball placed between them will come in contact with the adjacent peripheries of the wheels, means for revolving said wheels simultaneously in opposite directions, but at different speeds, and means for adjusting the position of said frame and the upper wheel to elevate and lower the trajectory of the ball.

8. In a baseball pitching machine the combination of a pair of grooved wheels, an adjustable frame in which said wheels are rotatably mounted in alinement with each other, said wheels being separated such distance that a baseball placed between them will come in contact with the surface of the groove in each wheel, means for revolving said wheels simultaneously in opposite directions, but at different speeds, and means for adjusting the position of said frame and the upper wheel to elevate and lower the trajectory of the ball, substantially as and for the purposes specified.

In witness whereof I hereunto set my hand at Cleveland, Ohio, this 27th day of April, 1916.

BARTLEY N. MARTY.

In the presence of—
E. N. CONRAD,
E. A. PETERS.